United States Patent [19]
Hanley et al.

[11] Patent Number: 4,650,243
[45] Date of Patent: Mar. 17, 1987

[54] SLIDING AND VENTING SUNROOF

[75] Inventors: Martin G. Hanley, St. Louis, Mo.;
James L. Gowan, Kuttawa, Ky.;
Robert L. Deschamps, St. Louis, Mo.

[73] Assignee: Sky-Top Sunroofs, Ltd., St. Louis, Mo.

[21] Appl. No.: 626,664

[22] Filed: Jul. 2, 1984

Related U.S. Application Data

[63] Continuation-in-part of Ser. No. 526,787, Aug. 26, 1983.

[51] Int. Cl.[4] .................. B60J 7/05; B60J 7/053; B60J 7/057; B60J 7/185
[52] U.S. Cl. .................. 296/221; 296/216; 296/217; 296/222; 296/223; 296/224
[58] Field of Search .................. 296/216, 217, 221–224

[56] References Cited

U.S. PATENT DOCUMENTS

| | | | |
|---|---|---|---|
| 3,033,608 | 5/1962 | Golde | 296/217 |
| 3,507,537 | 4/1970 | Kouth et al. | 296/221 |
| 4,272,122 | 6/1981 | Schatzler et al | 296/221 |
| 4,272,125 | 6/1981 | Bienert et al. | 296/223 |
| 4,364,601 | 12/1982 | Katayama et al. | 296/221 |
| 4,403,805 | 9/1983 | Strem, Jr. | 296/221 |

FOREIGN PATENT DOCUMENTS 2286018 4/1976 France ............... 296/223

Primary Examiner—Robert B. Reeves
Assistant Examiner—Dennis H. Pedder
Attorney, Agent, or Firm—Sandler & Greenblum

[57] ABSTRACT

A sliding sunroof for a vehicle having an opening in its roof. The sunroof includes a housing, a sunroof cover, a device for moving the cover forward and rearward, a device for lifting the cover upward from an open position to a closed position and further upward to a vented position and downwardly in the reverse direction, and locking mechanisms for securely locking the sunroof in these positions. The locking mechanisms include a ramp guide attached to the moving device, and a lift arm attached to the cover. The lift arm has a portion that rides up the ramp guide. The locking mechanisms include a lock slide slidingly attached to the ramp guide and having a slanted portion positioned above the riding up portion when the cover is in its open position for preventing the riding up portion of the lift arm and the cover from being vertically displaced in the open position.

54 Claims, 35 Drawing Figures

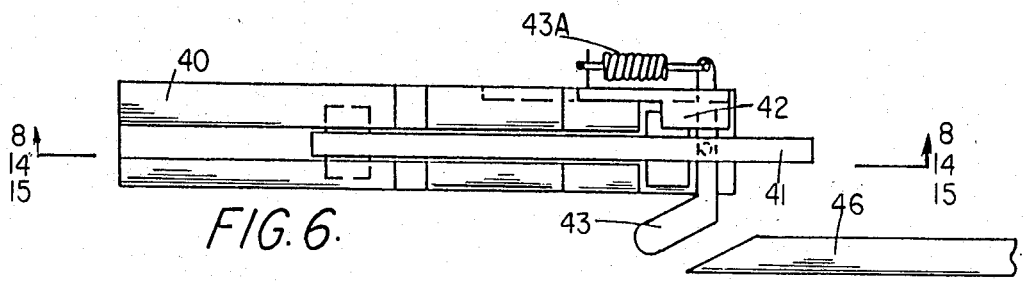
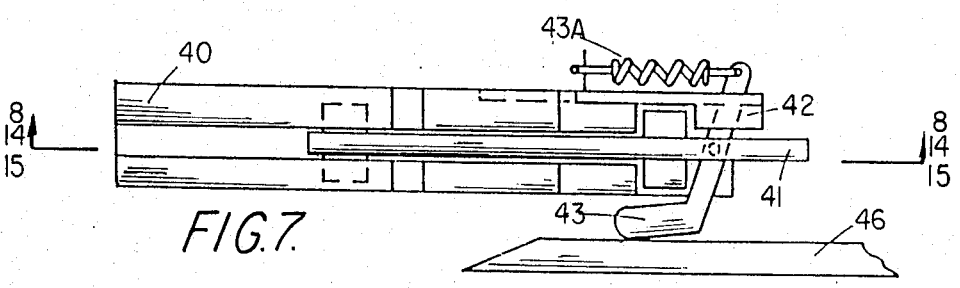
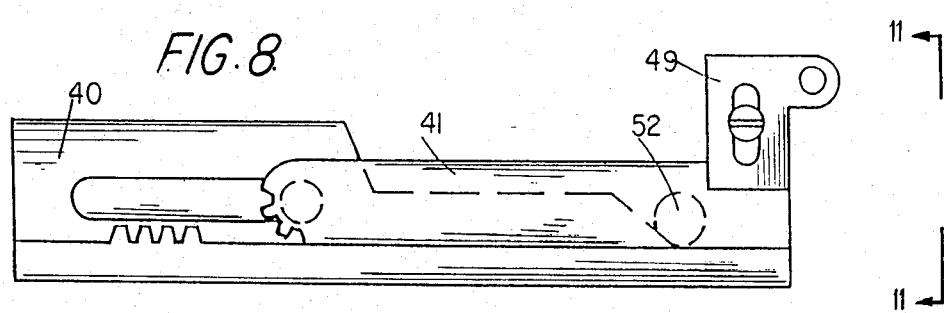
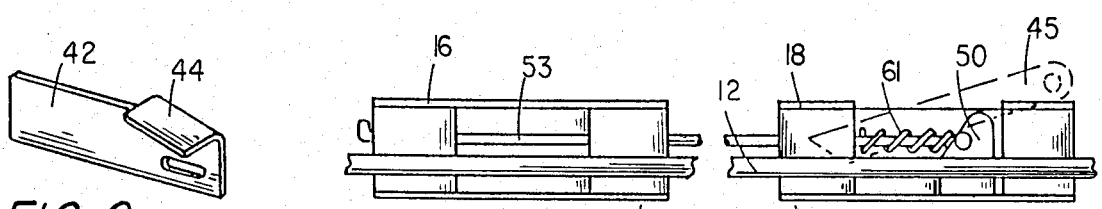

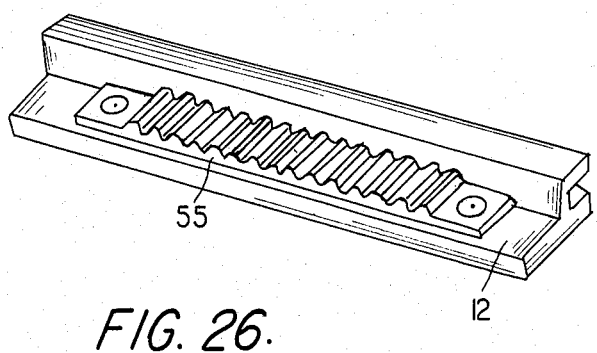
FIG. 26.
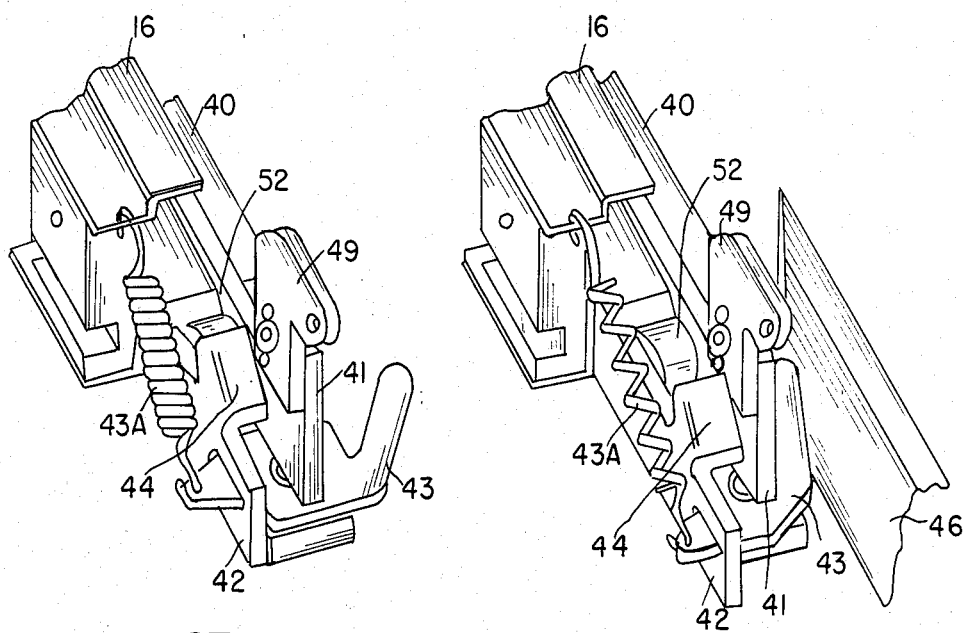
FIG. 27.
FIG. 28.

SLIDING AND VENTING SUNROOF

CROSS REFERENCE TO PARENT APPLICATION

This application is a continuation-in-part application of patent application Ser. No. 526,787 filed Aug. 26, 1983.

FIELD OF THE INVENTION

The present invention relates to an improvement in a sliding sunroof for a vehicle having an opening in the roof thereof comprising:
(1) a housing,
(2) a sunroof cover, and
(3) means for moving said sunroof cover forward and rearward;
(4) means for moving the rear of the sunroof cover upward to a closed position and further upward to a vent position, and downwardly in the reverse direction in response to movement of the forward and rearward moving means; and
(5) means for securely locking said sunroof in these positions.

The present invention relates more particularly to a translucent or transparent sliding sunroof having a rigid sliding and venting cover for an opening in the roof of a vehicle to permit a maximum viewing area from inside the vehicle when the cover is in its closed position and provide minimum loss of headroom under the roof of the vehicle.

The present invention also relates to a translucent or transparent sliding and venting cover for a vehicle roof opening having minimal framing and whose front points of attachment and positioning control are an integral part of a front frame member and are readily adjustable and serviceable with the cover in place. As a result there is no need to hide the front points of attachment or positioning control in a full or partial decorative internal frame.

The present invention has the advantages of U.S. Pat. No. 4,039,222. It also provides space within its thin envelope for a sliding sunshade which operates independently of the sliding cover in the forward (closing) direction, but which is carried automatically rearward by the sliding cover when it is opened. The present invention also provides an automatically operating wind deflector.

DESCRIPTION OF THE PRIOR ART

Sliding roof covers constructed of glass with the capability to both slide open and move upward into a venting position, as heretofore known, comprised a mechanism which required peripheral cable drive systems. Such mechanisms have inherent disadvantages that include a likelihood of becoming unbalanced so that the moving panel is no longer positioned or stressed evenly on both sides. They also suffer from an inability to reliably remain locked in the flush closed position against both downward (inward) as well as upward (outward) pressures generated, for example by slamming a car door which compresses the interior air. Further, they have attachment means and mechanical means that are positioned so that they require the use of a decorative frame on the underside of the glass cover to hide the attachment means or mechanical means. These known sliding roof covers are described in U.S. Pat. Nos. 4,085,965—Schlapp, 4,364,601—Katayama, and 4,379,586—Kaltz.

In another known arrangement, a translucent cover has been combined with a sliding frame, whereby the cover lifts from the frame into a venting position and the frame drops down and rearward to provide an open position. This arrangement is also based on a dual cable mechanism, and the cover/frame combination has the disadvantage of increasing the thickness of the cover and reducing the effective translucent opening and again requiring a decorative trim frame as described in U.S. Pat. No. 4,342,482—Koral.

Thus, in converting sliding glass covers to a slide/vent mode, or converting slide/vent metal covers to glass, means heretofore known have either sacrificed viewing area, vehicle headroom, or both.

SUMMARY OF THE PRESENT INVENTION

The present invention relates to a sliding and venting sunroof. The present invention also relates to a sliding and venting sunroof that allows viewing through the maximum width of a translucent cover while intruding into the vehicle's headroom no more than many metal sliding roofs heretofore known, such as U.S. Pat. No. 4,039,222 which describes the thinnest envelope translucent panel power sunroof presently available.

The present invention also relates to a positive locking control for locking the sliding venting cover in all positions—vent, closed, or open—but particularly to a positive locking means for locking the cover in both the up and down direction at the rear of the cover when the cover is in a closed position flush with the vehicle roof.

U.S. Ser. No. 526,787 filed Aug. 26, 1983 describes such a slide/vent sunroof.

The present invention is an improvement on said U.S. Ser. No. 526,787 and includes the following additional features:

I. A slidable water trough.

The water trough is slidably attached to the sunroof so that (1) it remains under the seal between the cover and the sunroof housing as it moves to the slide and vent positions and (2) it prevents protrusion of the water trough into the roof opening. The water trough of U.S. Ser. No. 526,787 is not slidable;

II. A locking means having a slanted portion which facilitates the locking of the lifting means for the roof panel.

A slanted Lock Slide is attached a ramp guide for locking the lifting means in the open position. This slanted lock slide is used in place of the lock pin of U.S. Ser. No. 526,787. The slant in the lock slide in combination with spring action in a lock arm which actuates the lock slide takes up play in the mechanism without close tolerances; and III. A cam means which allows the lifting means for the roof panel to operate so as to direct the roof panel underneath the roof opening.

The present invention uses a span bar, the rear end of which is connected to a rear glider which moves forward and rearward and supports the rear end of the cover. A lift arm is attached to the rear glider so that forward movement of the rear glider lifts the lift arm, thereby lifting the cover into its closed and vented positions as will be discussed in more detail below. A span bar connects the rear glider to a front glider. The front of the span bar is connected to a front lock spring and the cam. The combination Front Lock Spring-cam-span bar is slidably attached to the front and rear glider and is employed to take up play, with few adjustments in the mechanism, and without close tolerances. The spring retards the action of the cam until the mechanism is ready to operate.

Thus, the above features:
(1) Reduce play in the sunroof (without close tolerances and fewer adjustments) by means of:
  (a) front lock spring-cam-span bar interaction;
  (b) slanted lock slide-lock arm-spring interaction.
(2) The trough, by being slidably attached to the sunroof, is maintained in position under the seal between the cover and the sunroof and vent and avoids its protrusion into the opening.

Although improvements I, II, and III are shown in the preferred embodiment, not all of these features need be employed in one sunroof.

This invention achieves its advantages by the following major features:

1. By using a power bar (cross member) the cover which can be composed of glass operates with minimum visibility of the operating means in the open, closed or vent positions. The power bar is separate from and rearward of the glass cover and is driven by a moving means positioned at the center of the power bar in the preferred embodiment. This moving means may be a screw shaft, a tape mechanism, or a flexible cable. It is within the scope of the invention to attach the power bar at its outboard end to a pair of cables for effecting movement.

2. By slidably attaching a water trough to the power bar so that the trough is beneath the rear cover seal between the rear end of the cover and the car roof when the cover is in its closed position the apparatus catches any water passing this seal.

3. By incorporating a lifting mechanism that includes a movable ramp that lifts the panel toward its closed (sealed) position, and a lifting arm that carries the cover into its vent position, the lifting arm cam incorporate a pinion gear at its lower end to lock into a rack to secure the cover in its vent position.

4. By using a spring loaded locking slide which secures the cover in its open position rattles are prevented and premature lift as the operating means carries the cover first rearward and then forward toward its closed position is prevented. A lateral ramp in the housing can be provided for interacting with the locking slide to disengage it to permit cover closure.

5. A cylindrical tab on the lift arm interacts with the locking tab on the rear glider to provide positive and rattle-free locking of the cover in its closed position, flush with the vehicle roof, subject to either downward or upward pressure on the cover.

6. The front adjusting bar described in U.S. Pat. No. 4,039,222 has been improved and reduced to two front pivot rods (left and right) each attached to two front pivot blocks that provide attachment means for the front gliders, and adjustment means in both horizontal and vertical directions between the cover and the front gliders. The adjustment means remain easily accessible yet are even less obtrusive than previously and require no decorative trim.

7. By providing a spring loaded catch arm pivotally attached to the front cover support and interacting with a catch bracket to prevent rearward movement of the cover while in the vent position, jamming of the mechanism and possible damage to the cover and the vehicle roof paint are avoided.

8. By using both vertical and horizontal adjustment means which have been incorporated in the adjusting arm that connects the lift arm to the rear of the cover, these means are located in a non-obtrusive manner outboard of the normal viewing area so as to require no interior trim.

9. The present invention uses two pinion gears, connected by an alignment axle and attached to the power bar, that engage with an alignment rack during the close/vent/open positions of the cover thereby preventing the power bar from allowing the cover to become out of alignment with the tracks (guide rails).

While the preferred embodiment of the invention has been set forth hereinabove, it is not intended to limit the invention solely thereto, but to include all of the variations and modifications within the scope and spirit of the invention. As an example one may vary the single element drive means among several well known in the trade, or apply a known dual cable system to either front or rear; one may also replace the translucent or transparent panel with a metal or plastic panel and permanently attach the sunshade thereunder in a known fashion.

BRIEF DESCRIPTION OF THE DRAWINGS

FIG. 6 is a top view of the lifting mechanism showing the lock engaged;

FIG. 7 is a top view of the lifting mechanism showing the lock disengaged;

FIG. 8 is a cross-sectional view taken along line 8—8 in FIG. 7 showing the gear teeth on the lift arm and ramp guide;

FIG. 9 is a perspective view of the lock slide showing the slanted tab portion;

FIG. 10 is a cross-sectional view showing the cam, the front lock spring, and the span bar slideably attached to front and rear glider;

FIG. 26 is a perspective view of the alignment rack;

FIGS. 27 and 28 are perspective views of the locking mechanism for locking the lift arm and the span bar in the locked and unlocked positions, respectively;

COMPONENT LIST

Figure 1:
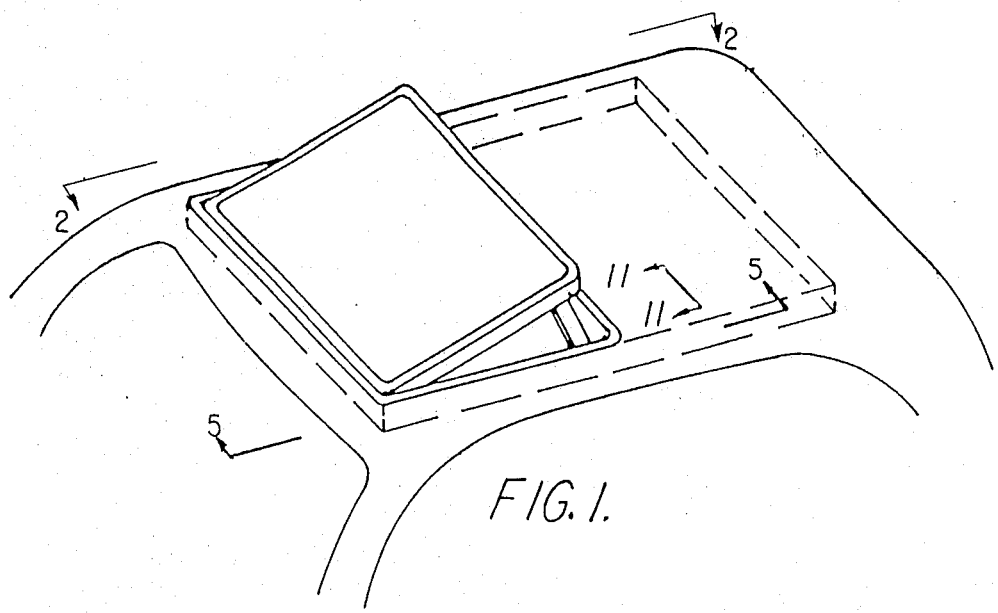
FIG. 1 is a perspective view of a vehicle having a sliding roof assembly in the vent position constructed according to the teachings of this invention mounted therein.
Figure 2:
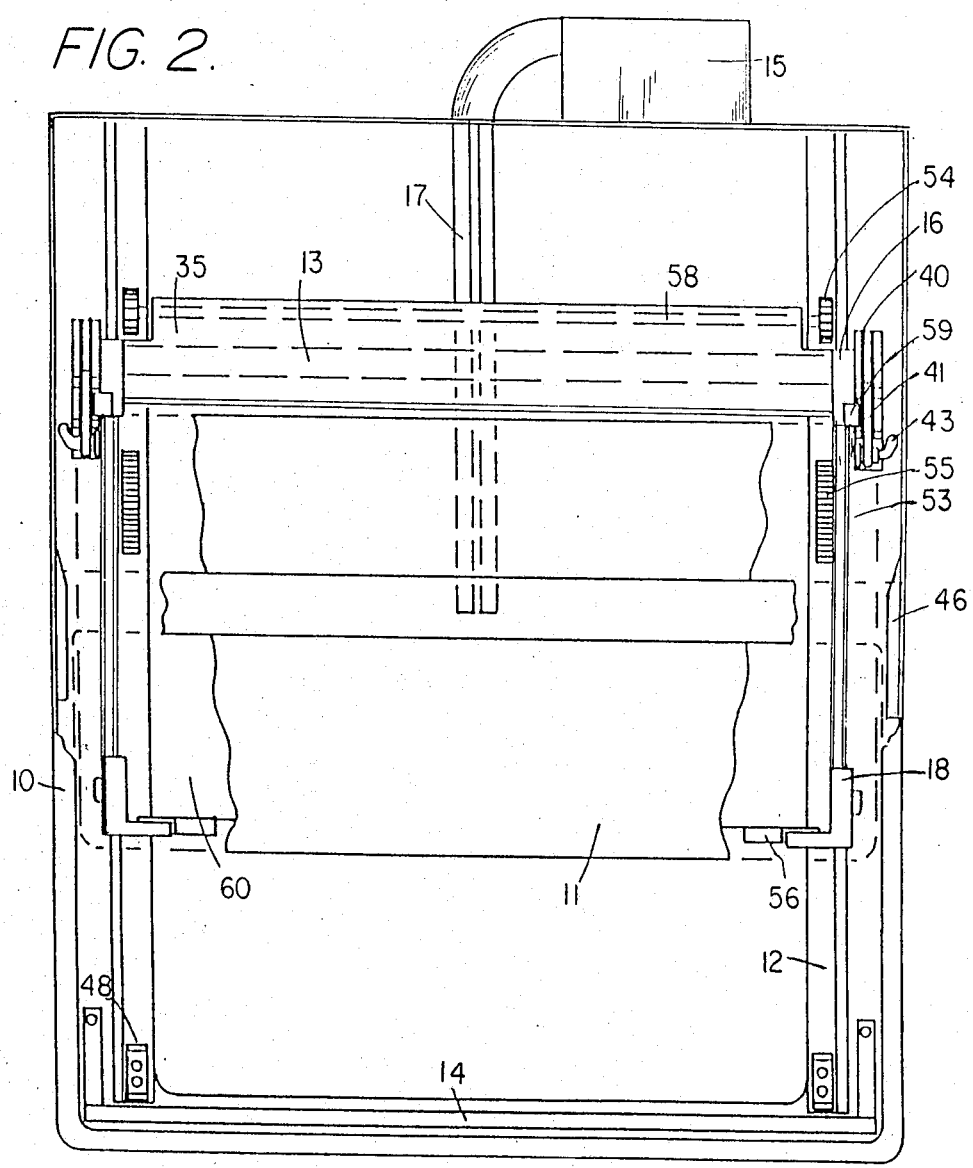
FIG. 2 is a top view showing the assembled sunroof kit.

10: sunroof housing
11: roof panel (glass)
12: track
13: power bar (cross member) and power bar spring 13A
14: wind deflector assembly
15: motor and gearbox assembly or manual handcrank (would be repositioned)
16: rear glider
17: drive mechanism (cable, leadscrew or tape)
18: front glider (front cover support)
35: water trough (slidably attached to a power bar)
40: ramp guide (attached to rear glider and allows lift arm to slide within it)
41: lift arm (one end slides in ramp guide and other end is attached to roof panel)
42: lock slide
43: lock arm (operates lock slide) and lock arm spring 43A
44: slanted tab portion of the lock slide 42
45: catch arm
46: side ramp (attached to side of housing)
47: catch bracket (combined with front stop)
48: front stop (attached to track)
49: adjust arm (attached to lift arm)
50: cam
51: bolt (for lateral adjustment of roof panel)
52: cylindrical tab (attached to lift arm)
53: span bar (connecting cam 50 to rear glider)
54: rear pinion gear
55: alignment rack
56: front pivot block
57: front pivot rod
58: alignment axle
59: locking tab
60: sunshade
61: front lock spring

DESCRIPTION OF THE PREFERRED EMBODIMENT

Figure 3:
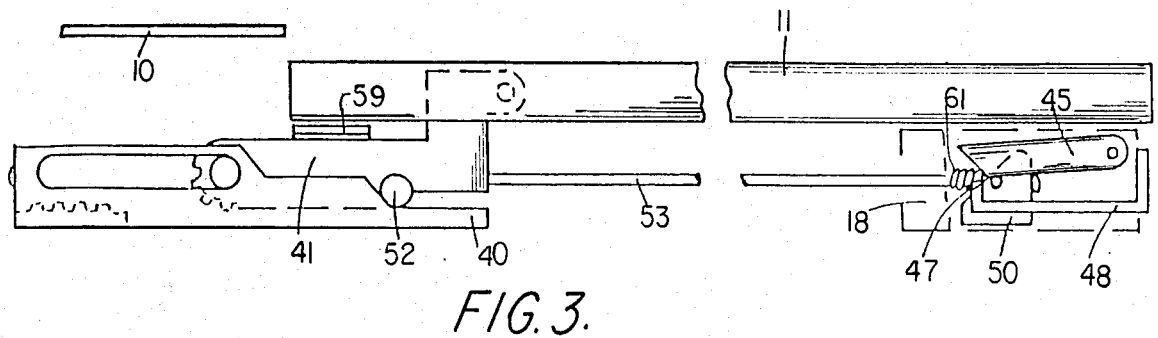
FIG. 3 is a side view showing the roof panel in an open position.
Figure 4:
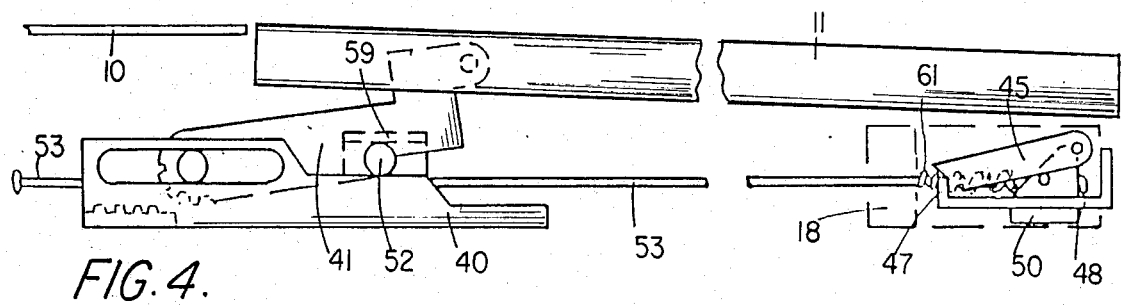
FIG. 4 is a side view showing the roof panel in the closed position.
Figure 5:
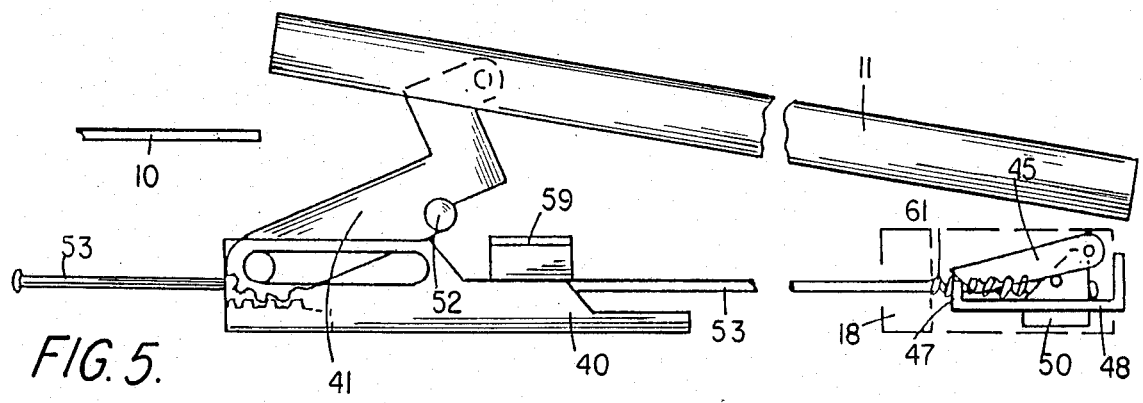
FIG. 5 is a side view showing the roof panel in the vent position.

The present invention comprises a sliding sunroof for a vehicle having an opening therein. The sunroof comprises a sunroof housing 10 which houses a roof panel 11. The rear of roof panel 11 can be positioned in three positions: an open position, which is its bottommost position and is illustrated in FIG. 3, a closed position, in which the rear of panel 11 is raised with respect to the open position, and which is illustrated in FIG. 4, and a vent position in which panel 11 is raised to an even higher position than the closed position, which is illustrated in FIG. 5.

Figure 13:
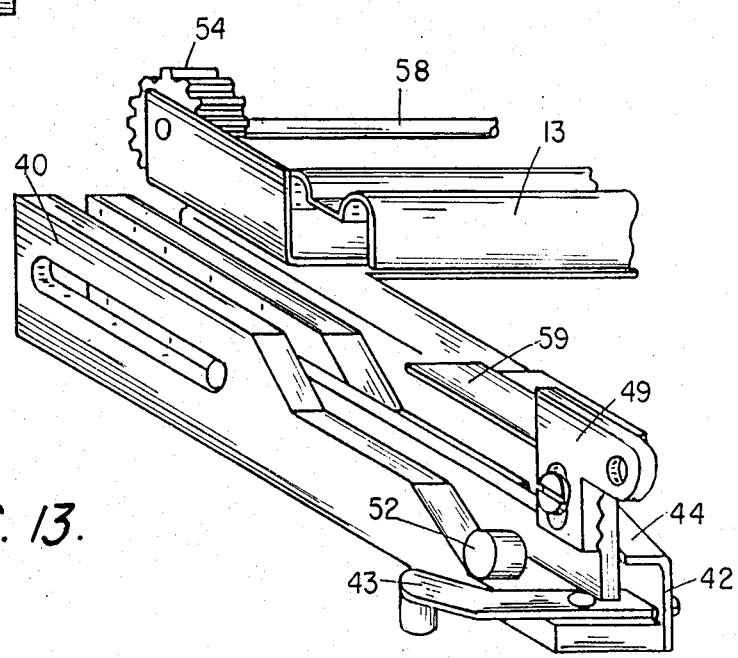
FIG. 13 is a perspective view of the lifting mechanism.

The sunroof also comprises a drive means 17, seen in FIG. 1, which will be described in more detail below, which drives a cross bar 13 forward and rearward. Crossbar 13 is connected to rear glider 16 as seen in FIG. 13. Rear glider 16 is connected to an assembly of elements, including roof panel 11, that are displaced forwardly and rearwardly in housing 10 by glider 16 and cross bar 13. In order to maintain the forward and rearward direction of travel of glider 16 and the assembly, cross bar 13 is attached to alignment axle 58. A pinion 54 is attached at each end of alignment axle 58, and pinion 54 engages a rack 55 on track 12 of housing 10 as illustrated in FIG. 36.

As illustrated in FIGS. 13, and 19-21, rear glider 16 is attached to a ramp guide 40. Ramp guide 40 has two slots therein which are adapted to engage a portion of a lift arm 41, as illustrated in FIGS. 3-5. The top of lift arm 41 is attached to panel 11 by adjustment arm 49 and a bracket mounted on a bolt 51 at the top of arm 49, illustrated in FIG. 11. As a result of this arrangement, rear glider 16 supports the rear end of panel 11.

The front of panel 11 is supported by a front glider 18. Front glider 18 is connected to the front of panel 11 by front pivot blocks 58. Front glider 18 is also connected to rear glider 16 via span bar 53 and via panel 11. Span bar 53 is slidingly attached to rear glider 16.

Figure 15:
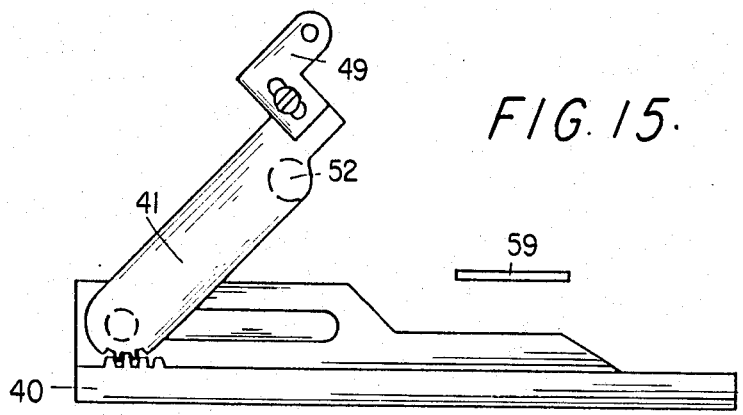
FIG. 15 is a cross-sectional view showing the pinion gear teeth of the lift arm meshing with the rack gear teeth of the ramp guide.
Figure 16:
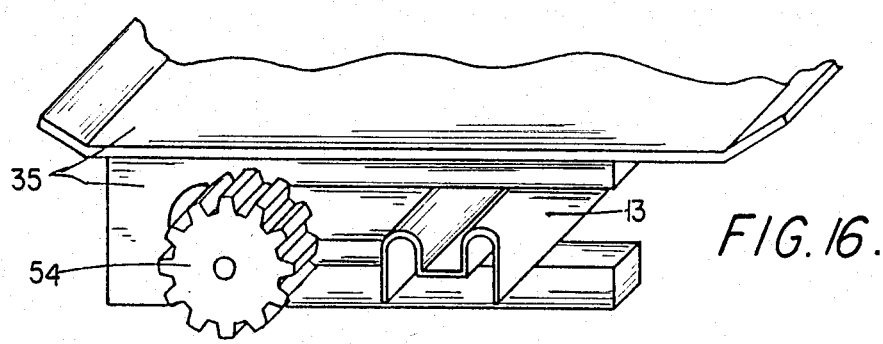
FIG. 16 is a perspective view showing the rear pinion gear and axle in relation to the power bar and water trough.
Figure 18:
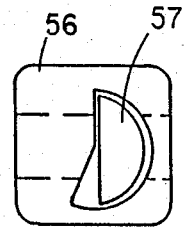
FIG. 18 is a side view of the front pivot.
Figure 17:
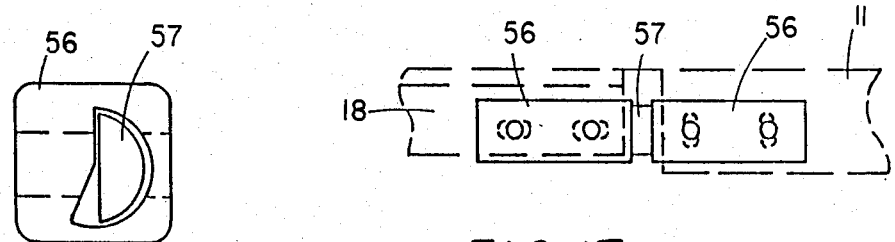
FIG. 17 is a front view of the front pivot.
Figure 19:
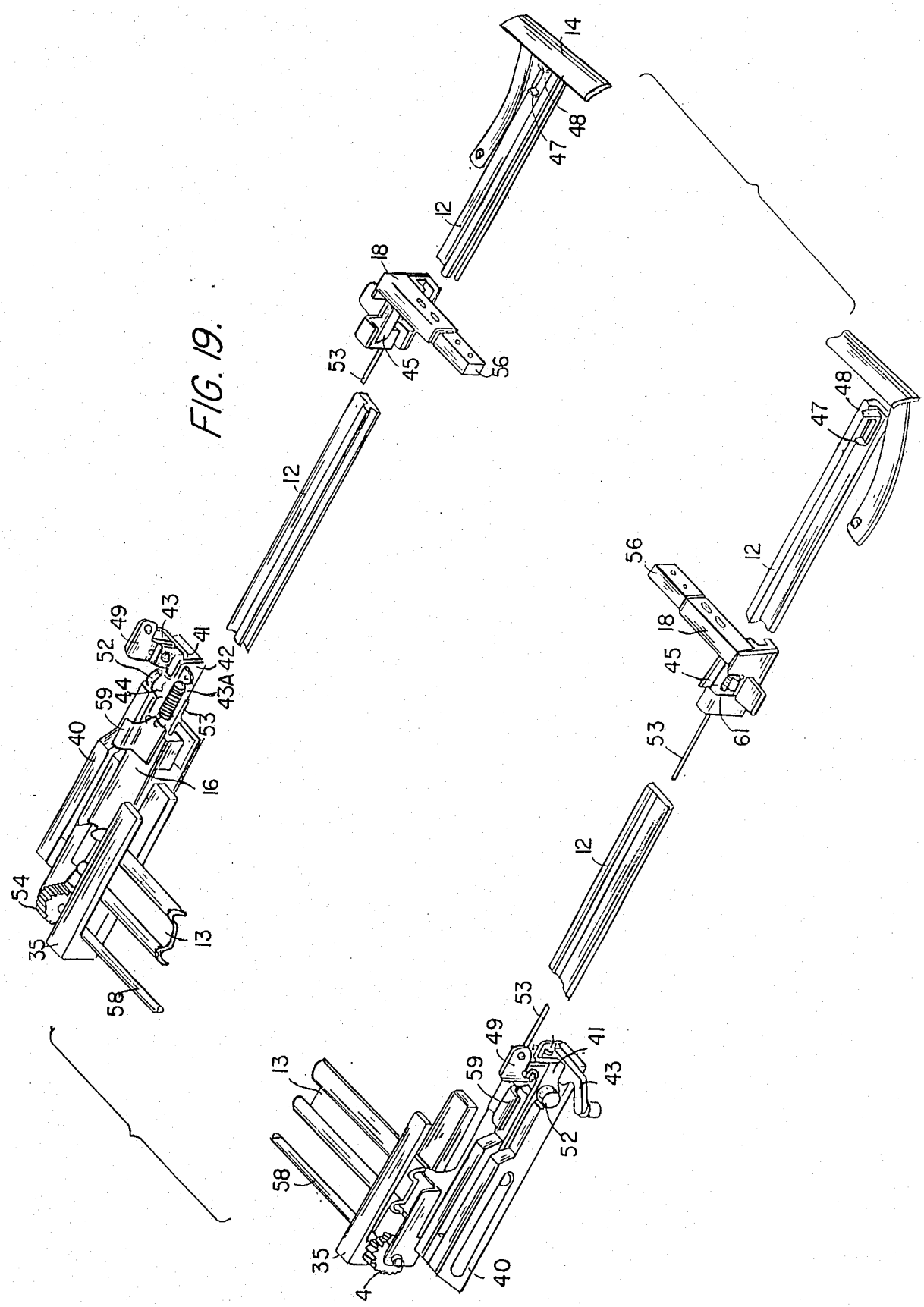
FIG. 19 is a perspective view of a portion of the present invention in the open position.
Figure 20:
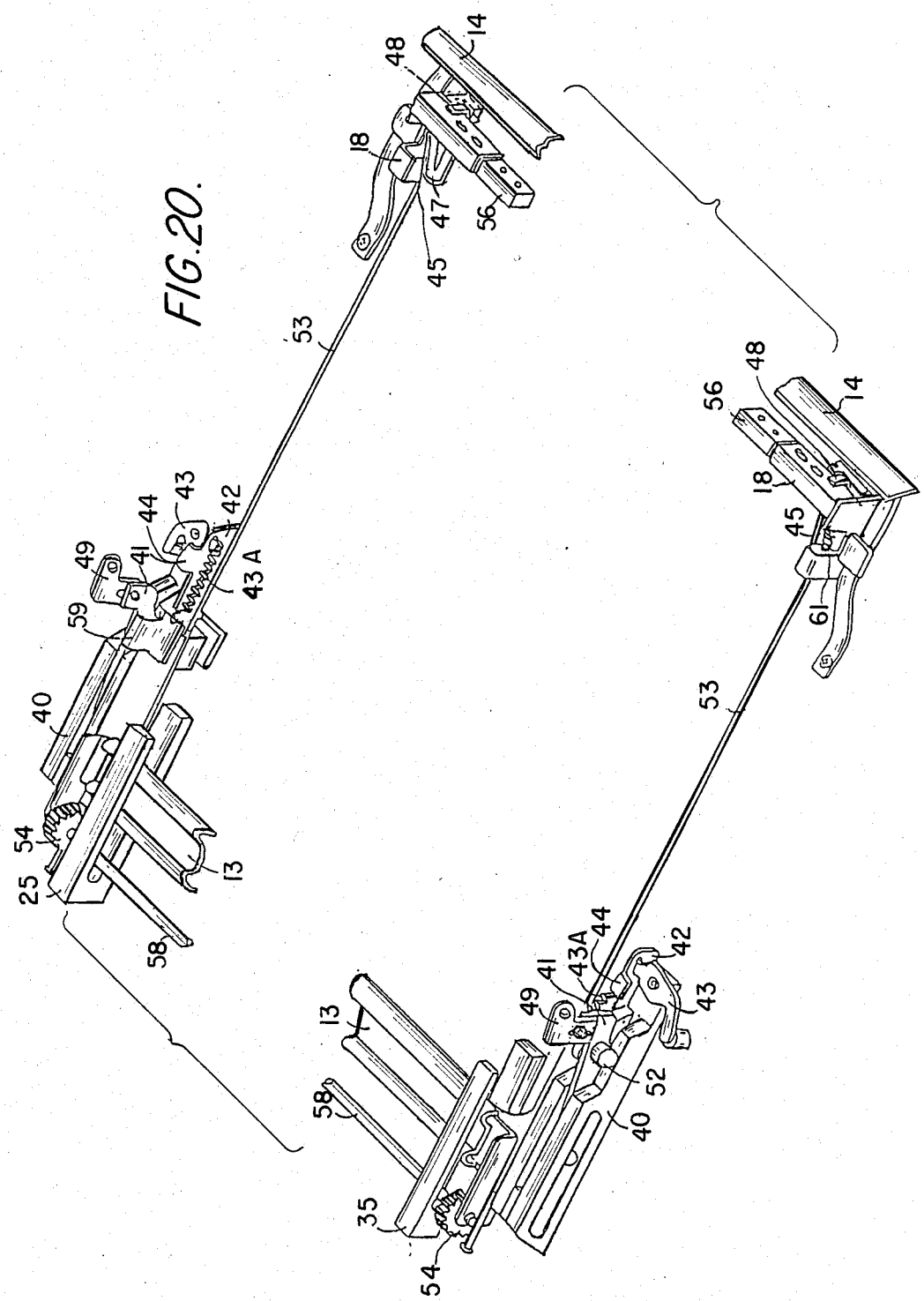
FIG. 20 is a perspective view of a portion of the present invention in the closed position.
Figure 21:
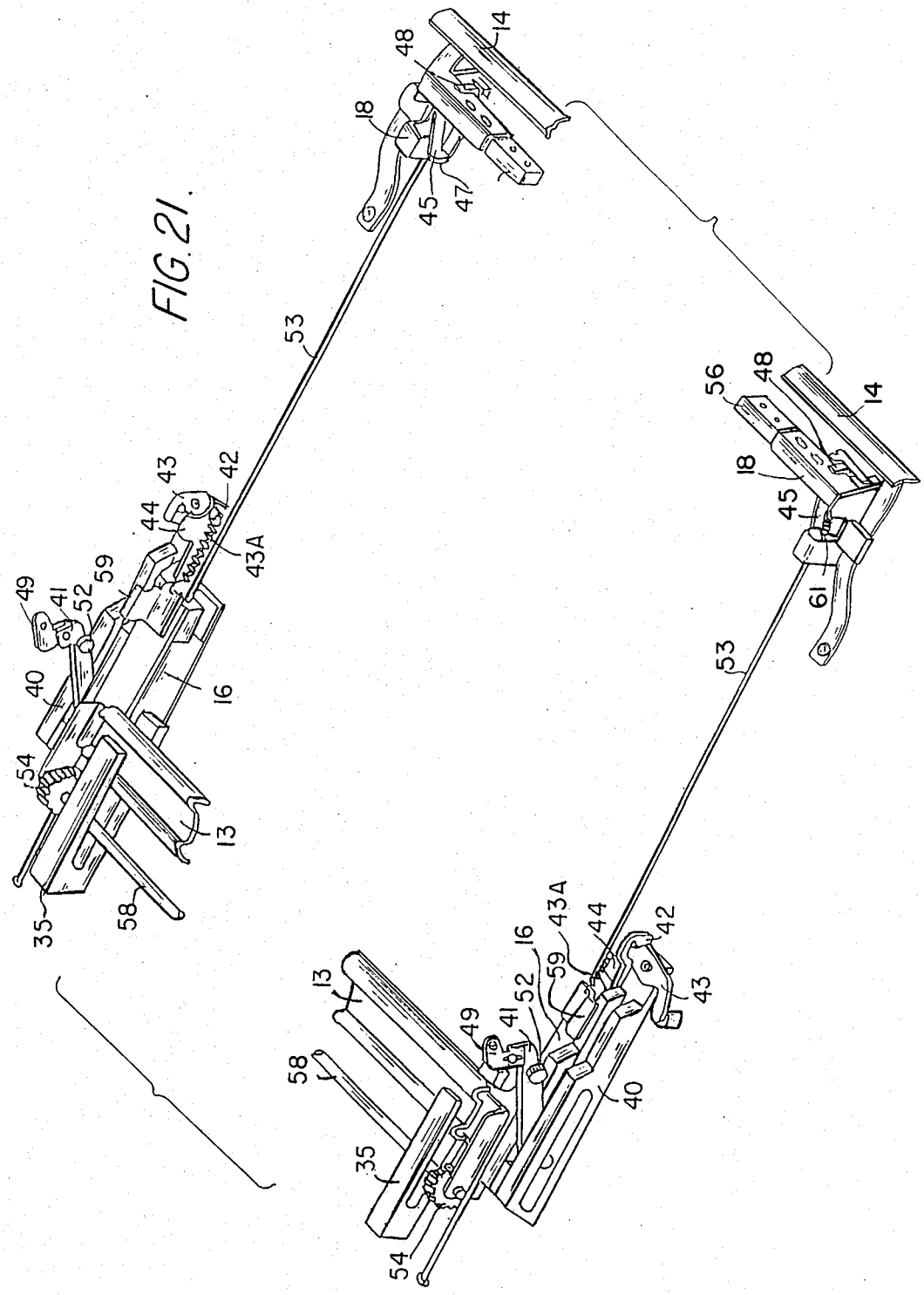
FIG. 21 is a perspective view of a portion of the present invention in the vent position.
Figure 24:
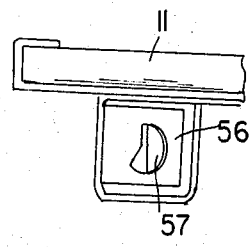
FIGS. 24 and 25 are side cross-sectional views of the front pivot block and rod in two different positions.
Figure 25:
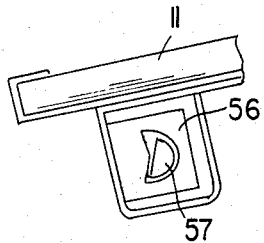
Figure 22:
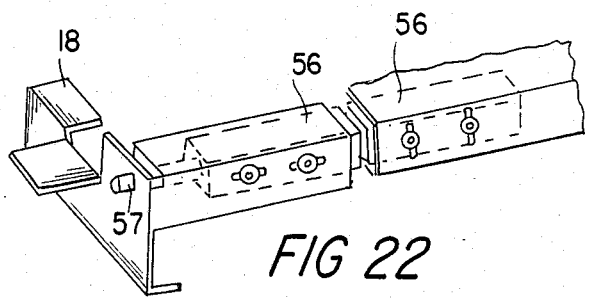
FIGS. 22 and 23 are perspective views of the front pivot block and rod in two different positions.
Figure 23:
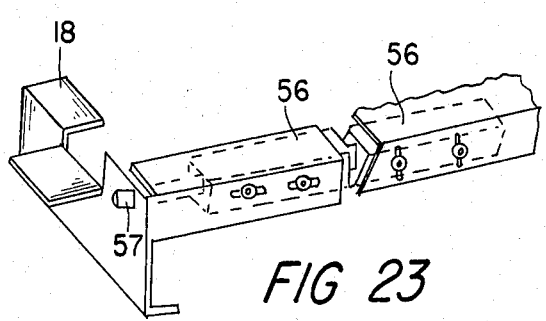
Figure 29:
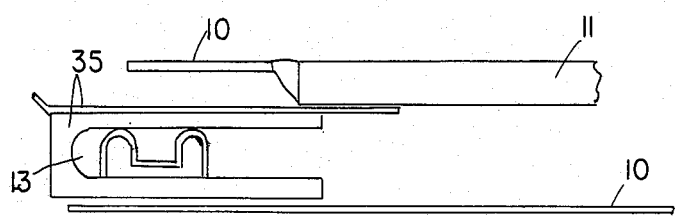
FIG. 29 is a schematic side view of the water trough positioned beneath the seal of the panel when the panel is in its closed position.

In the open position illustrated in FIGS. 3 and 19, the rear portion of panel 11 is positioned below housing 10 and the front of panel 11 and front glider 18 are spaced from the front of the housing. When the apparatus is activated, cross bar 13 is displaced in the forward direction, thereby displacing guide 40, arm 41, a panel 11 and front glider 18 forwardly, as illustrated in FIG. 20. At some point during the forward movement of front glider 18 and panel 11, these elements contact the front of housing 10 and stop. As a result, lift arm 41 also halts its forward movement because it is attached to panel 11. However, guide 40 continues moving forward. This forward movement of guide 40 is possible because guide 40 and lift arm 41 are not rigidly attached but rather are slidingly attached; a portion of arm 41 slides in a slot in guide 40 as illustrated in FIGS. 3 and 4 when guide 40 continues to move forward. As will be explained in more detail below, this relative movement between lift arm 41 and ramp guide 40 causes a tab 52 on arm 41 to ride up a ramp on ramp guide 40, thereby lifting the rear of panel 11 into the closed position flush with housing 10 as is illustrated in FIGS. 4 and 20. Further forward movement of ramp guide 40 moves ramp gear teeth attached to ramp guide 40 into contact with pinion gear teeth on lift arm 41, thereby raising lift arm 41 and the rear of roof panel 11 even higher into a vented position as illustrated in FIGS. 5, 15 and 21.

As seen in FIGS. 3-7, 13, 19-21, and 27-28, the Power Vent mechanism comprises a ramp guide 40, which is attached to the outboard side of rear glider 16. Glider 16 acts as a means for supporting the rear of panel 11 and is slidingly attached to tracks 12. Ramp guide 40 encloses lift arm 41 which is adapted to slide forward and rearward within slots located on both sides of the ramp guide 40 so as to comprise means for sliding within the slots. Lift arm 41 slides within the ramp guide 40 on one end while the other end is pivotally attached to roof panel 11. Lift arm 41 also has a cylindrical tab 52 on both sides which rides on a ramp portion of the ramp guide 40. Also provided is a lock arm 43 and a spring 43A for biasing lock arm 43 into the position illustrated in FIG. 6. Lock arm is 43 pivotally attached to guide 40. Lock arm 43 operates a lock slide 42 by pulling it forward and rearward. Lock slide 42 slides within a slot in the ramp guide 40 and has a slanted tab portion 44 which slides over the inboard cylindrical tab 52 of the lift arm 41 and holds down the lift arm 41.

Slanted tab portion 44 is adapted to be displaced between a position aligned with and directly above tab 52 to prevent upward movement of tab 52 when panel 11 is in the open position and a position above and unaligned with tab 52 so as to permit upward movement of tab 52 up the ramp portion of guide 40 thereby permitting panel 11 to be moved into the closed position. Spring 43A biases slanted tab portion 44 into its aligned position directly above tab 52.

Slanted tab portion 44 is displaced between these two positions by lock arm 43 which extends through an opening in lock slide 42. Lock arm 43 also extends from the exterior side of ramp guide 40. In addition, a side ramp 46 is provided which extends inwardly from an interior wall of housing 10. Side ramp 46 is positioned such that side ramp 46 engages and pivots lock arm 43 to slide slanting portion 44 to its unaligned position in response to forward movement of ramp guide 40 from its position corresponding to the open position of panel 11 illustrated in FIGS. 6, 19, and 27 to a position corresponding to the closed position of panel or cover 11, as illustrated in FIGS. 7, 20, and 28.

Figure 34:
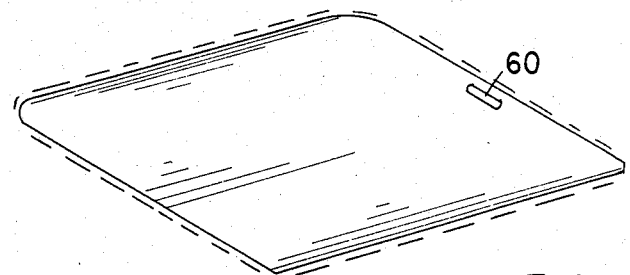

As a result, slanting portion 44 comprises an element adapted to be displaced into and out of engagement with lift arm 41 so as to lock lift arm 41 against relative movement with ramp guide 40 when engaged with lift arm 40, and so as to unlock lift arm 41 to permit relative movement between ramp guide 40 and lift arm 41 when disengaged from said lift arm. In addition, lock arm 43 functions as a means for displacing slanting portion 44 out of engagement with lift arm 41 in response to contact between side ramp 46 and lift arm 43. A span bar 53 is attached at one end to rear glider 16 and at the other end to a front glider 18. Span bar 53 slides forward and rearward with rear glider 16 and ramp guide 40 and is disposed parallel to tracks 12. Front glider 18 supports the front of panel 11. A catch arm 45 is pivotally attached to the front glider 18 and the rear end of catch arm 45 is biased downwardly toward engagement with catch bracket 47 by spring 61. As seen in FIGS. 3-5 and 19-21 a cam 50 is attached to the front end of span bar 53. Cam 50 is adapted to be displaced forwardly and rearwardly along the length of catch arm 45 as rear glider 16 is moved forwardly and rearwardly by power bar 13. When cam 50 is in a first position illustrated in FIG. 3 corresponding to the open position of the cover 11, cam 50 causes the rear end of catch arm 45 to pivot upwardly so as to support the rear end of cam 50 out of contact with and above catch bracket 47 (attached to track 12) against the bias of a spring 61. When cam 50 slides forward to a second position illustrated in FIGS. 4 and 5, in which panel 11 is in its open or vented positions, cam 50 no longer contacts the rear end of catch arm 45. As a result, the rear end of catch arm 45 rotates downward into engagement with catch bracket 47 due to the downward bias of spring 61, thereby preventing rearward movement of cover 11 when cover 11 is in its closed and vented positions. As a result, cam 50 comprises means for elevating catch arm or element 45 above catch bracket 47 when panel 11 is in the open position. In addition, catch bracket 47 acts as a means for engaging one end of catch arm 45 when panel 11 is displaced into its closed and vented positions because when panel 11 is in its closed and vented positions cam 50 comprises means for permitting the downward bias on catch arm 45 to displace catch arm 45 downwardly into contact with catch bracket 47. Two front pivot blocks 56, one attached to the front gider 18 and one attached to the roof panel 11 on either side thereof, rotate about the front pivot bar 57 as seen in FIGS. 17, 18, and 22-25. Vertically and horizontally extending slots in blocks 56 and front glider 18 permit the adjustment of the horizontal and vertical position of cover 11. An alignment axle 58 is attached to the rear of the power bar 13 with rear pinion gears 54 attached at either end which engage the alignment racks 55 attached to the tracks 12 as seen in FIGS. 19-21 and 26. In addition a deflector 14 and sunshade 30 are provided which are adapted to be displaced between open and closed positions as seen in FIGS. 30, and 31, and 34, 34, respectively.

Figure 30:
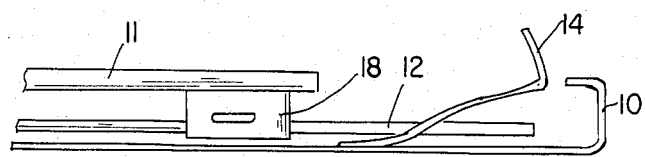
FIGS. 30 and 31 are schematic side views of the deflector when the roof is in the opened and closed positions, respectively.
Figure 31:
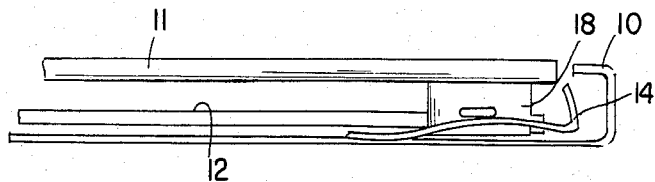

Deflector 14 is positioned at the front of housing 10 such that it is contained within the housing when the cover is in the closed position and deflector 14 moves upward when panel 11 is in the open position as seen in FIGS. 30 and 31.

Figure 32:
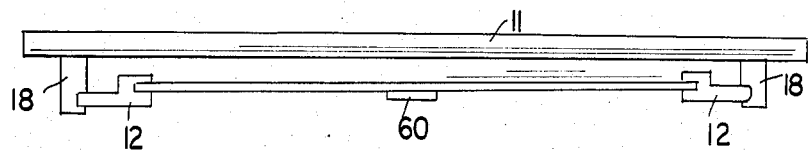
FIG. 32 is a front view showing the sunshade riding on the tracks.
Figure 33:
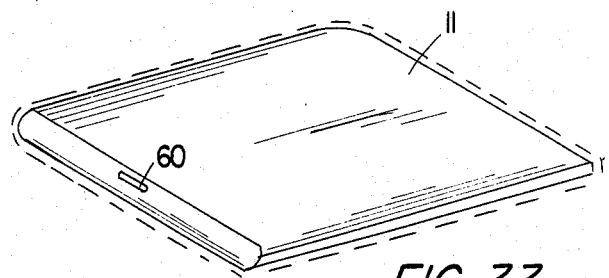
FIGS. 33 and 34 are perspective views of cover 11 and sunshade 60 from a point inside the automobile upon which the present invention is installed in which sunshade 60 is in the open position and the closed position, respectively.

Sunshade 30 is slidably attached to guide rails 12 as seen in FIG. 32.

Also, a water trough 35 is provided and is positioned directly underneath the seal between panel 11 and the housing opening when panel 11 is in the closed position.

Figure 12:
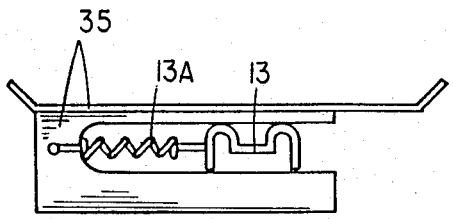
FIG. 12 is a cross-sectional view showing the power bar and water trough.
Figure 11:
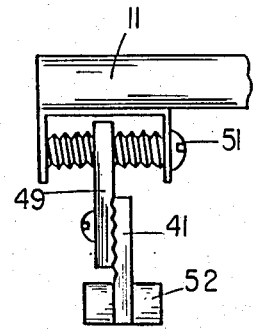
FIG. 11 is a front view taken along line 11—11 in FIG. 8 showing the vertical height adjustment means at the rear of the roof panel.
Figure 35:
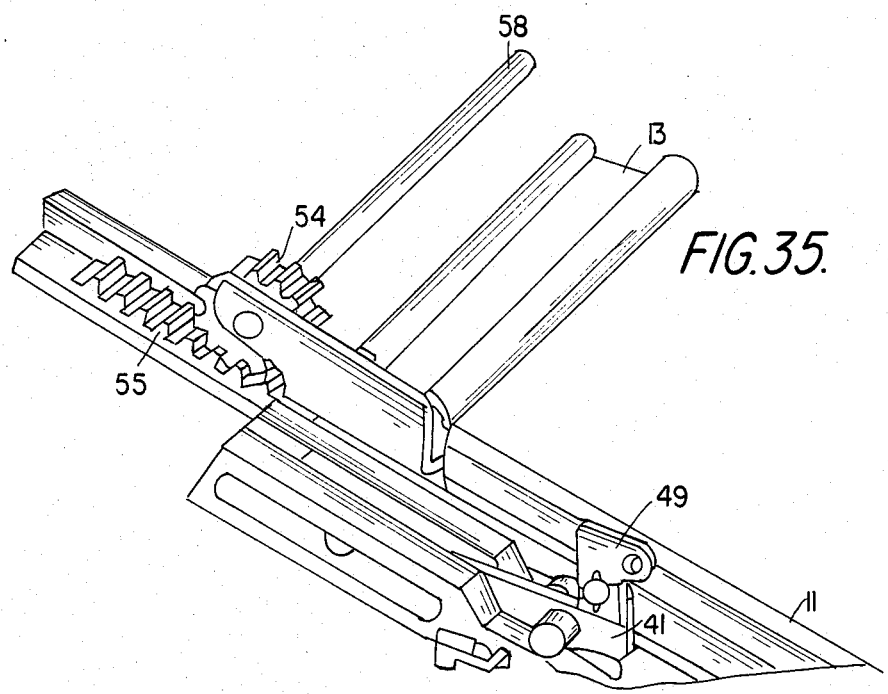
FIG. 35 is a perspective view showing pinion gears 59 engaging alignment racks 55.

In explaining the operation of the Power Vent, it will be assumed that the roof panel 11 is in the fully open position, or fully retracted within the housing 10 underneath the vehicle roof. In the open position, the relationship of the roof panel 11 to the lift arm 41 is as shown in FIG. 3 and the lock slide 42 is in the position shown in FIGS. 6, 19, and 27. The sliding end of the lift arm 41 is fully forward in the slots of the ramp guide 40 and the cylindrical tabs 52 are at the bottom of the ramp portion of the ramp guide 40. The slanted tab portion 44 of the lock slide 42 is in a position above and contacting the cylindrical tab 52 of the lift arm 41. Tab portion 44 is slanted upwardly so as to take up the play between portion 44 and tab 52 when biased by spring 43A, without the necessity of providing close tolerances for these elements. The mechanism is driven forward by the power bar 13 which is driven by a motor and gearbox 15 through a drive mechanism 17. The drive mechanism may consist of a lead screw, cable or cables, plastic tape, or other suitable means, driven by an electric motor and gearbox or a manual handcrank. The drive mechanism may be selectively attached to the center of the movable cross member (single drive) or to the two ends of the movable cross member (dual cable drive). The explanation of the operation of the Power Vent will assume that the drive mechanism 17 is being driven by an electric motor and gearbox attached to the center of the movable power bar 13. As the Power Vent mechanism approaches the closed position, the lock arm 43 is deflected by a side ramp 46 which is attached to the housing 10 wall against the bias of spring 43A as seen in FIGS. 7 and 28. The lock arm 43 pulls the lock slide 42 forward, disengaging the cylindrical tab 52 of the lift arm 41 to allow the lift arm 41 to rotate upwardly. The lock arm 43 and lock slide 42 are now in the position shown in FIGS. 7, 20, and 28. At this point the wind deflector assembly 14 will be retracted to its stowed position as seen in FIG. 31 and the sunshade 60 will be free to move into its closed position to shield any light being transmitted through the translucent panel as seen in FIG. 34. At approximately the same time, the rear pinion gears 54 engage the alignment racks 55 insuring that both sides of the roof panel 11 proceed forward evenly as seen in FIG. 35. The Power Vent mechanism continues moving forward until the front glider 18 contacts the front stop 48 as seen in FIG. 21. At this point span bar 53 has displaced cam 50 forward so that, spring 61 causes the catch arm 45 to rotate downward and engage the catch bracket 47 which prevents the roof panel 11 from being pulled rearward as shown in FIG. 4. Further forward movement of the ramp guide 40 causes the cylindrical tabs 52 to be forced up the ramp portion of the ramp guide 40 until they are resting on top of the ramp portion as seen in FIGS. 20 and 28. In this position, the roof panel 11 will be in the closed position as shown in FIG. 4. The Lock Arm 43 on one side will trip a position switch (not shown) at this point and stop the forward movement of the ramp guide 40. In this closed position of panel 11 cylindrical tabs 52 are resting on top of the ramp portion and the inboard cylindrical tab 52 is caught underneath a locking tab 59 attached to the rear glider 16, thus preventing the roof panel 11 from being moved up or down as shown in FIG. 4. If the roof panel 11 is not even with the vehicle roof, it may be adjusted up or down by moving the adjust arm 49 up or down in relation to the lift arm 41 as shown in FIGS. 8 & 11 so that arm 49 comprises means for adjusting the length thereof. Also in this position, the water trough 35 attached to the power bar 13, as shown in FIG. 12, is directly below the gap between the roof panel 11 and the vehicle roof and housing 10 and trough 35 is positioned directly underneath the seal between panel 11 and the roof opening. Attached between trough 35 and power bar 13 is a spring 13A as shown in FIG. 12, which spring loads trough 35.

Figure 14:
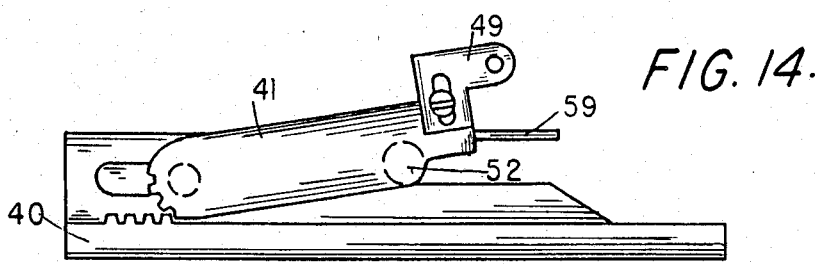
FIG. 14 is a cross-sectional view showing the pinion gear teeth of the lift arm contacting the rack gear teeth of the ramp guide.

When the operating switch is released and pressed again in the forward direction, the power bar 13 will drive the ramp guide 40 forward again, causing the cylindrical tab 52 to ride along the top of the ramp and the end of the lift arm 41 that is entrapped in the slots of the ramp guide 40 will continue to slide rearward in the slots until the cylindrical tab 52 clears the locking tab 59 on the rear glider 16 and the pinion gear teeth on the lift arm 41 contact the rack gear teeth on the ramp guide 40, as shown in FIG. 14. At this point, the lift arm 41 is free to rotate upward and further forward movement of the ramp guide 40 causes the gear teeth to mesh and rotate the lift arm 41 upward lifting the roof panel 11 into the vent position as shown in FIGS. 5, 15, and 21. Because of the rack and pinion connection between lift arm 41 and guide 40 and because of the connection between guide 40 and gearbox 15, once arm 41 is in the vent position the lift arm and the cover will resist further movement due to the resistance of gearbox 15. As a result, gearbox 15 and the rack and pinion together comprise means for preventing forward movement of the lift arm in the vent position. The roof panel 11 is allowed to rotate upward by means of a front pivot which consists of two front pivot blocks 56 and a front pivot bar 57. One front pivot block 56 is attached to the front glider 18, while the other front pivot block 56 is attached to the roof panel 11. Both front pivot blocks 56 rotate about the front pivot bar 57 as shown in FIGS. 17 & 18, 22–25, thus allowing the roof panel 11 to rotate in relation to the front glider 18. In order to insure that the roof panel 11 vents straight up and down, a means for adjusting the roof panel's 11 position in relation to the lift arms 41 is provided as shown in FIG. 11. The end of the adjust arm 49 that is attached to the roof panel 11 is threaded so that turning the bolt 51 will move the roof panel 11 laterally with respect to the vehicle roof.

In going from the vent position to the open position, all processes are reversed. The rearward movement of the ramp guide 40 causes the gear teeth to rotate the lift arm 41 downward as seen in FIGS. 14 and 15 until the cylindrical tabs 52 rest on top of the ramp portion and proceed underneath the locking tab 59 of the rear glider 16. At this point the position switch is tripped again causing the rearward movement to stop. When the operating switch is released and pressed again in the rearward direction, the ramp guide 40 continues moving rearward thereby pulling the cam 50 rearward which deflects the catch arm 45 upward allowing the catch arm 45 to clear the catch bracket 47. The rearward movement of the ramp guide 40 also allows the cylindrical tabs 52 to ride down the ramp portion, and causes the end of the lift arm 41 to ride forward in the slot of the ramp guide 40; when the forward end of the slot is reached, the roof panel 11 is pulled rearward underneath the vehicle roof opening. As it proceeds rearward, the lock arm 43 rides off of the side ramp 46 and pushes the lock slide 42 rearward so that the slanted tab portion 44 of the lock slide 42 is in a position above and contacting the cylindrical tab 52 of the lift arm 41, thus preventing the roof panel 11 from accidentally lifting while opening or closing.

The mechanism can be operated manually with the following modifications: (1) a handcrank can be used in lieu of a motor, (2) a stop in lieu of a sensing switch to halt the cover in its closed position, which would be disengaged to allow continuing forward travel of the cover to its vent position, and (3) a solid stationary stop can be used in the full vent position in lieu of the second sensing switch.

We claim:
1. A sliding sunroof for a vehicle having an opening in the roof thereof comprising:
   (1) a housing;
   (2) a sunroof cover;
   (3) means for moving said sunroof cover forward and rearward;
   (4) means for lifting the rear of the sunroof cover upward from an open position to a closed position and further upward to a vent position, and downwardly in the reverse direction;
   (5) means for securely locking said sunroof in said positions;
   wherein said lifting means comprises:
      (a) a ramp guide attached to said moving means; and

(b) a lifting arm, wherein said lifting arm is attached to said sunroof cover and wherein said lifting arm comprises means for riding up said ramp guide, wherein said locking means comprises a lock slide slidingly attached to said ramp guide and comprising a slanted portion, positioned above said riding means when said cover is in said open position for preventing said riding means and said cover from being vertically displaced in said open position.

2. The vehicle sunroof of claim 1 said lifting means comprising a ramp for lifting the cover into a flush closed position and a rack and pinion gear combination for lifting the rear of said sunroof cover upward into a vent position.

3. The vehicle sunroof of claim 2 further comprising a rear cover support means for supporting the rear portion of said cover wherein said lifting means is attached to said rear cover support means, said ramp guide comprising:
(i) a forward end comprising a ramp portion;
(ii) a slot having a rear portion; and
(iii) rack gear teeth positioned adjacent to said slot; wherein said
lifting arm is slideably encaptured in said slot of said ramp guide, wherein said lifting arm comprises:
(i) a forward end
(ii) means for pivotally attaching said arm to said cover at the forward end of said lift arm;
(iii) said riding means positioned for riding up said ramp portion of said ramp guide;
(iv) means for sliding within said slot of said ramp guide; and
(v) pinion gear teeth on the rear end of said arm to mesh with said rack gear teeth on said ramp guide.

4. The vehicle sunroof of claim 3 wherein the rear cover support means-lifting mechanism combination further comprises a horizontal locking tab that prevents the riding means on the lifting arm from upward movement while said riding means is riding on top of the ramp portion of the ramp guide, thus creating a positive locking for preventing any vertical movement of the cover while said cover is in the closed position.

5. The vehicle sunroof of claim 3 further comprising a positive lock for preventing the cover from being displaced from said vent position.

6. The vehicle sunroof of claim 3 wherein said pivotally attaching means comprises means of adjusting the length of said pivotally attaching means thereby providing vertical adjustment of the rear of said cover to allow proper positioning of said cover in the closed position.

7. The vehicle sunroof of claim 3 wherein said forward portion of the lifting arm further comprises means for horizontally adjusting said cover in the vent position to allow proper venting and closing of said cover.

8. The vehicle sunroof of claim 3 wherein said lifting means further comprises means for locking the lifting arm to the ramp guide to prevent the cover from lifting while in the open position, said locking means preventing said lifting arm from moving in relation to said ramp guide until said locking means is disengaged prior to said cover moving into the closed position.

9. The vehicle sunroof of claim 8 further comprising:
front cover support means;
a plurality of guide tracks for guiding said means for moving said cover; and
a bar disposed parallel to said guide tracks, wherein said rear cover support means-lifting mechanism combination is slidably attached to said front cover support means by means of said bar.

10. The vehicle sunroof of claim 3 further comprising:
a bracket;
a front cover support means for supporting the front of the cover; and wherein said locking means further comprises means for locking said cover in said vent position to prevent said cover from rearward movement in said vent position, wherein said locking means comprises a member pivotally attached at one end to said front cover support means such that when the cover is moved into the vent position, the other end of said member rotates downward into said bracket, so as to comprise a positive locking means preventing said cover from moving rearward while in the vent position.

11. The vehicle sunroof of claim 3 further comprising a plurality of connecting bars and a front cover support means for supporting the front of said cover, wherein the front cover support means is attached to the cover by means of said connecting bars rotatably attached thereto, thus allowing said cover to rotate about said front cover support means, said connecting bars comprising means for the horizontal and vertical adjustment of said cover thereby allowing for proper positioning of said cover.

12. The vehicle sunroof of claim 3 wherein said cover forms a seal with said opening when said cover is in the closed and vented positions, wherein said sunroof further comprises a water trough positioned directly underneath the seal between the cover and the roof opening when said cover is in the closed or vented positions.

13. A sliding sunroof for a vehicle having an opening in the roof thereof comprising:
a movable sunroof cover adapted to effect open, closed and vent positions;
means for moving said cover forward and rearward;
a lifting mechanism capable of lifting the cover into the closed position flush with the roof opening and into a vent position above the roof opening; a cam attached to said moving means and adapted to be displaced forwardly and rearwardly by said moving means;
a catch element attached to said cover and biased downwardly into a downward position; and
means for engaging said catch element in said downward position, to prevent rearward movement of said catch element and said cover when said catch element engages said engaging means,
wherein said cam comprises means for elevating said catch element above said engaging means when said cover is in said open position and means for permitting said downward bias to displace said catch element into said downward position when said cover is in at least one of said closed and said vented positions.

14. The vehicle sunroof of claim 13 wherein said lifting mechanism comprises a ramp for lifting the cover into a flush closed position and a rack and pinion gear combination for lifting the rear of the sunroof cover upward into a vent position.

15. The vehicle sunroof of claim 14 wherein said lifting mechanism comprises:
(a) a ramp guide; and
(b) a lift arm slideably engaged in said ramp guide, wherein said ramp guide comprises;

(i) a ramp portion at the forward end of said guide;
(ii) a slot for slideably engaging said lift arm; and
(iii) rack gear teeth positioned adjacent said slot, wherein said arm comprises:
  (i) means for pivotally attaching said arm to said cover at the forward end of said lift arm;
  (ii) means positioned to ride up said ramp portion of said ramp guide;
  (iii) means for sliding within said slot of said ramp guide; and
  (iv) pinion gear teeth on the rear end of said arm to mesh with said rack gear teeth of said ramp guide.

16. The vehicle sunroof of claim 15 wherein the rear cover support means-lifting mechanism combination further comprises a horizontal locking tab for preventing said riding means on the lift arm from upward movement while said riding means is riding on top of the ramp portion of the ramp guide, thus creating a positive locking means preventing any vertical movement of the cover while in the closed position.

17. The vehicle sunroof of claim 15 wherein said pinion gear teeth engaging said rack gear teeth in combination with said moving means comprise means for lifting said cover to said vent position and preventing forward movement of said arm and said cover when said cover is in said vent position.

18. The vehicle sunroof of claim 15 wherein said means for pivotally attaching said cover to said lift arm further comprises an arm and means for adjusting the length of said arm thereby providing vertical adjustment of the rear of said cover to allow proper positioning of said cover in the closed position.

19. The vehicle sunroof of claim 15 wherein said means for pivotally attaching said cover to said lift arm further comprises means for horizontally adjusting said cover in the vent position to allow proper venting and closing of said cover.

20. The vehicle sunroof of claim 15 wherein said lifting mechanism further comprises means for locking the lift arm to the ramp guide to prevent the cover from lifting while in the open position, said locking means preventing said lift arm from moving in relation to said ramp guide until said locking means is disengaged prior to said cover moving into the closed position.

21. The vehicle sunroof of claim 20 further comprising:
front cover support means;
a plurality of guide tracks for guiding said means for moving said cover;
a bar disposed parallel to said guide tracks, and wherein said rear cover support means-lifting mechanism combination is slidably attached to said front cover support means by means of said bar.

22. The vehicle sunroof of claim 15 further comprising:
a bracket;
a front cover support means for supporting the front of the cover; and
means for locking said cover in said vent position to prevent said cover from rearward movement in said vent position, wherein said locking means comprises a member pivotally attached at one end to said front cover support means such that when the cover is moved into the vent position, the other end of said member rotates downward into said bracket, thus creating a positive locking means preventing said cover from moving rearward while in the vent position.

23. The vehicle sunroof of claim 15 further comprising a plurality of blocks and a front cover support means for supporting the front of said cover, wherein the front cover support means is attached to the cover by means of said blocks rotatably attached thereto, thus allowing said cover to rotate about said front cover support means, said blocks comprising means for the horizontal and vertical adjustment of said cover thereby allowing for proper positioning of said cover.

24. The vehicle sunroof of claim 15 further comprising a movable cross member and a rear cover support for supporting the rear of said cover, wherein said movable cross member is spaced from and positioned rearward of said cover and is attached to said rear cover support, wherein said moving means is applied to said cover through said movable cross member, wherein said cover forms a seal with said roof opening when said cover is in said closed position, wherein said sunroof further comprises a water trough slidably attached to the movable cross member such that said water trough is positioned directly underneath said seal between the cover and the roof opening when said cover is in at least one of the following positions: the closed position and the vented position.

25. The sunroof of claim 13 further comprising:
a rear cover support means for supporting the rear of said cover and attached to said cover through said lifting mechanism;
a housing for housing said moving means, said lifting mechanism, and said rear cover support means, said housing comprising a plurality of tracks longitudinally positioned along the outer edges of the opening in said housing;
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

26. The sunroof of claim 14 further comprising:
a rear cover support means for supporting the rear of said cover and attached to said cover through said lifting mechanism;
a housing for housing said moving means, said lifting mechanism, and said rear cover support means, said housing comprising a plurality of tracks longitudinally positioned along the outer edges of the opening in said housing;
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

27. The sunroof of claim 15 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

28. The sunroof of claim 16 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

29. The sunroof of claim 17 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

30. The sunroof of claim 18 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

31. The sunroof of claim 19 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

32. The sunroof of claim 20 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

33. The sunroof of claim 21 further comprising:

a rear cover support means for supporting the rear of said cover and attached to said cover through said lifting mechanism;

a housing for housing said moving means, said lifting mechanism, and said rear cover support means, said housing comprising a plurality of tracks longitudinally positioned along the outer edges of the opening in said housing;

a sunshade, slidably attached to said tracks and adapted to effect open and closed positions, positioned underneath said sunroof cover; and a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

34. The sunroof of claim 22 further comprising:
a rear cover support means for supporting the rear of said cover and attached to said cover through said lifting mechanism;
a housing for housing said moving means, said lifting mechanism, and said rear cover support means, said housing comprising a plurality of tracks longitudinally positioned along the outer edges of the opening in said housing;
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

35. The sunroof of claim 23 further comprising:
a rear cover support means for supporting the rear of said cover and attached to said cover through said lifting mechanism;
a housing for housing said moving means, said lifting mechanism, and said rear cover support means, said housing comprising a plurality of tracks longitudinally positioned along the outer edges of the opening in said housing;
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

36. The sunroof of claim 24 further comprising:
a rear cover support means for supporting the rear of said cover and attached to said cover through said lifting mechanism;
a housing for housing said moving means, said lifting mechanism, and said rear cover support means, said housing comprising a plurality of tracks longitudinally positioned along the outer edges of the opening in said housing;
a sunshade, slidably attached to said tracks and adapted to effect upon and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

37. The vehicle sunroof defined by claim 1 further comprising;
means for maintaining the cover in a squarely aligned position, said alignment means comprising:
(i) a plurality of tracks;
(ii) a movable cross member attached to said moving means;
(iii) rack gear teeth; and
(iv) a pair of pinion gears fixedly attached to each other wherein each pinion gear is, rotatable attached to the rear of a different end of said movable cross member, and wherein said pair of pinion gears meshes with said rack gear teeth, wherein said rack gear teeth are fixably attached to the top of said tracks.

38. The vehicle sunroof of claim 1 further comprising a slidable water trough; and a cam means for preventing said cover from being displaced rearwardly in said vent and closed positions.

39. The vehicle sunroof of claim 1 further comprising means for biasing said lock slide into said position above said riding means for preventing upward movement of said riding means when said cover is in said open position.

40. The vehicle sunroof of claim 39 wherein said lock slide comprises an opening therein, and further comprises a lock arm engaging said opening, wherein said slanted portion slides between a position aligned with and directly above said riding means to prevent upward movement of said riding means and a position above and unaligned with said riding means so as to permit upward movement of said riding means in response to displacement of said lock arm.

41. The vehicle sunroof of claim 40 wherein said ramp guide comprises an exterior side, wherein said lock arm is pivotally attached to said ramp guide and wherein said lock arm extends from said exterior side of said ramp guide, wherein said moving means moves said ramp guide forward from a position corresponding to the open position of said cover to a position corresponding to the closed position of said cover, wherein said housing comprises a side ramp positioned such that said side ramp engages and pivots said lock arm to slide said slanting portion to said unaligned position from said aligned position in response to forward movement of said ramp guide from said position corresponding to the open position of said cover to said position corresponding to the closed position of said cover.

42. The vehicle sunroof of claim 13 further comprising:
a rear cover support adapted to be displaced forwardly and rearwardly by said moving means;
a front cover support adapted to be displaced forwardly and rearwardly;
a span element connecting said rear and front cover supports, wherein said catch element is pivotally attached to said front cover support.

43. The vehicle sunroof of claim 42 wherein said cam is attached to the front of said span element.

44. The vehicle sunroof of claim 43 further comprising:
a plurality of tracks, wherein said moving means is slidably attached to said tracks, wherein said engaging means comprises a catch bracket attached to one of said tracks.

45. The vehicle sunroof of claim 44 further comprising means for biasing the rear end of said catch element downwardly.

46. The vehicle sunroof of claim 13 further comprising:
a housing having said opening therein and comprising a plurality of tracks longitudinally positioned along the outer edges of said opening in said housing;

rear cover support means, slidably attached to said tracks;

a movable cross member, wherein said moving means is applied from the rear of said housing and said cover through said movable cross member, wherein said movable cross member is separated from and rearward of said cover and is attached to said rear cover support means, wherein said rear cover support means is attached to said cover through said lifting mechanism;

a slidable water trough; and locking means having a slanted portion for locking said lifting means in said open position.

47. The vehicle sunroof of claim 13 wherein said cam further comprises means for permitting said downward bias to displace said catch element into said downward position when said cover is in said closed and vented position.

48. A sliding sunroof for a vehicle having an opening in the roof thereof comprising:
  (a) a housing comprising an interior wall and a side ramp extending inwardly from said interior wall;
  (b) a sunroof cover;
  (c) means for forwardly and rearwardly displacing said cover;
  (d) means for lifting said cover upwardly from an open position to a closed position and further upward to a vent position, and downwardly in the reverse direction, wherein said lifting means comprises:
    (i) a ramp guide attached to said moving means; and
    (ii) a lifting arm attached to said cover and said ramp guide comprising means for riding up said ramp guide, wherein said riding means rides up said ramp guide to lift said cover from said open to said closed position in response to relative movement between said lifting arm and said ramp guide; and
  (e) means for locking said cover in at least one of said positions, comprising:
    (i) an element adapted to be displaced into and out of engagement with said lift arm, wherein said element locks said lift arm against relative movement with said ramp guide when engaged with said lift arm and wherein said element unlocks said lift arm to permit relative movement between said ramp guide and lift arm when disengaged from said lift arm;
    (ii) means for displacing said element out of engagement with said lift arm in response to contact between said side ramp and said displacing means.

49. The sunroof of claim 48 wherein said displacing means comprises a lock arm pivotally attached to said ramp guide, wherein said ramp guide comprises an exterior side, wherein said lock arm extends from said exterior side of said ramp guide, wherein said side ramp is positioned at a point on said housing so that said side ramp contacts and pivots said lock arm when said ramp guide is displaced by said moving means.

50. The sunroof of claim 49 wherein said ramp guide has a slot therein, wherein said element comprises a lock slide slidingly attached to said ramp guide in said slot, wherein said lock slide has an opening therein, adapted to receive a portion of said lock arm therein.

51. The sunroof of claim 50 wherein said riding means comprises a tab, wherein said lock slide comprises a slanted portion adapted to be positioned in an aligned position directly above said tab for preventing upward movement of said tab when said cover is in the open position, and adapted to be displaced in front of said aligned position for permitting upward movement of said tab in response to pivoting of said lock arm by said side ramp.

52. The sunroof of claim 51 further comprising means for biasing said lock slide into said aligned position.

53. A vehicle sunroof for a vehicle having an opening in the roof thereof comprising:
  (a) a sunroof cover;
  (b) means for forwardly and rearwardly displacing said cover;
  (c) means for lifting said cover upwardly from an open position to a closed position and further upward to a vent position, and downwardly in the reverse direction;
  (d) a front cover support for supporting the front of said cover wherein said front cover support is adapted to be displaced forwardly and rearwardly by said moving means;
  (e) a catch element pivotally attached to said front cover support wherein one end of said catch element pivots downwardly in response to said cover being lifted into said closed position; and
  (f) means for engaging said one end of said catch element when said one end of said catch element pivots downwardly into contact with said engaging means wherein said engaging means and said catch element together comprise means for preventing rearward movement of said cover when said cover is in said closed position, said sunroof further comprising at least one track on which said front cover support and said moving means are adapted to be displaced forwardly and rearwardly, wherein said engaging means is positioned on said track, wherein said engaging means comprises a catch bracket, said sunroof further comprising means for biasing said one end of said catch element downward, said sunroof further comprising a cam, attached to said moving means, and engaging said catch element, wherein said cam is displaced by said moving means between first and second positions, wherein in said first position, said cam supports said one end of said catch element above said catch bracket, and wherein in said second position said cam is spaced from said one end of said catch element, thereby permitting said biasing means to pivot said one end of said catch element downwardly into engagement with said catch bracket.

54. The sunroof of claim 53 further comprising:
  a rear cover support for supporting said rear cover, wherein said rear cover support is attached to said moving means; and
  a span bar attached at one end to said cam and attached at its other end to said rear cover support.

* * * * *